Jan. 3, 1967    C. J. BURGIO, JR    3,295,195
METHOD AND MACHINE FOR INSERTING AND SECURING
PILE SEAL MATERIAL IN A CHANNEL IN A BAR
Filed Oct. 16, 1963    5 Sheets-Sheet 1

INVENTOR.
CHARLES J. BURGIO, JR.
BY
Cumpston E Shaw
HIS ATTORNEYS.

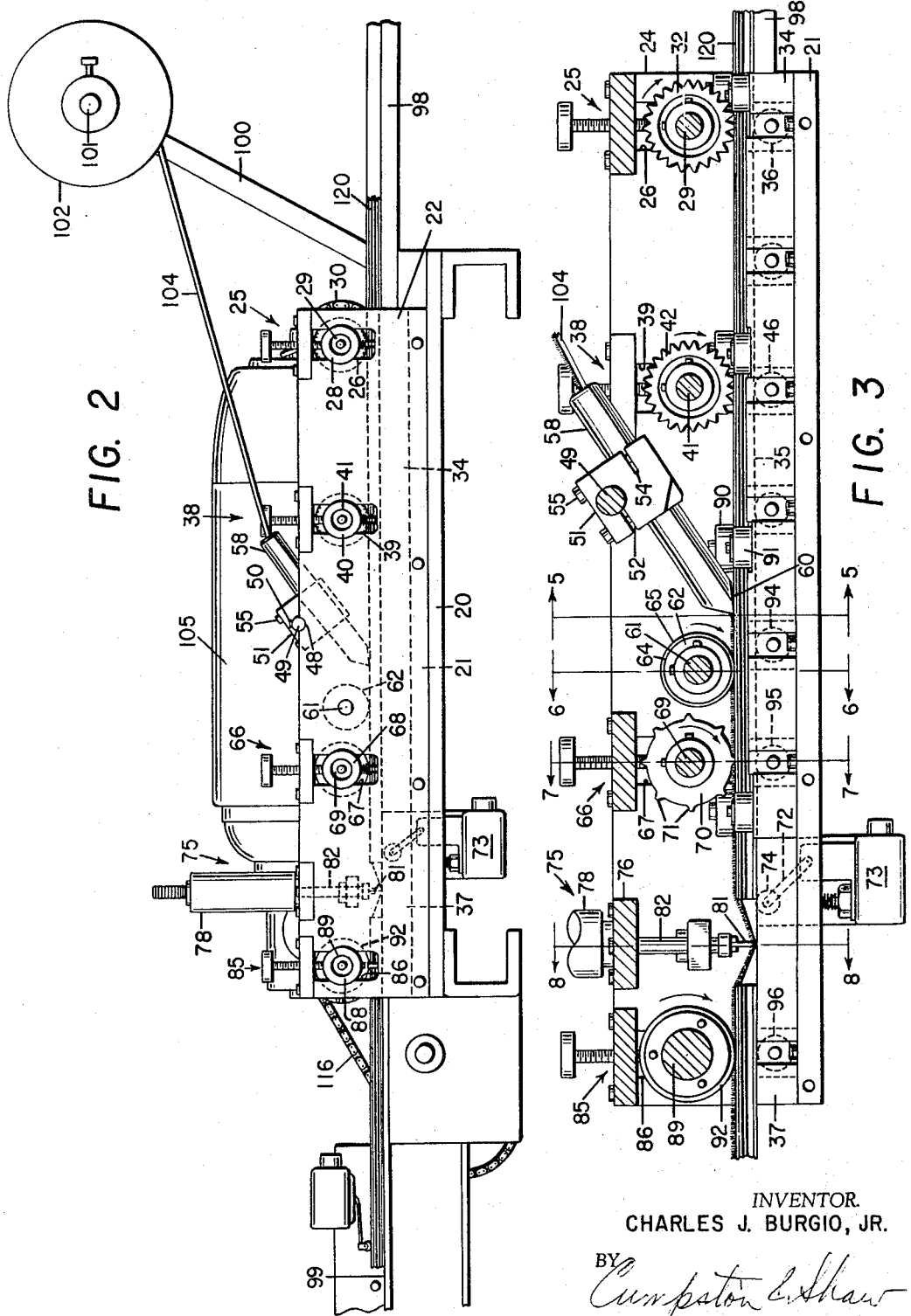

Jan. 3, 1967  C. J. BURGIO, JR  3,295,195
METHOD AND MACHINE FOR INSERTING AND SECURING
PILE SEAL MATERIAL IN A CHANNEL IN A BAR
Filed Oct. 16, 1963  5 Sheets-Sheet 4

INVENTOR.
CHARLES J. BURGIO, JR.

BY
HIS ATTORNEYS.

Jan. 3, 1967   C. J. BURGIO, JR   3,295,195
METHOD AND MACHINE FOR INSERTING AND SECURING
PILE SEAL MATERIAL IN A CHANNEL IN A BAR
Filed Oct. 16, 1963   5 Sheets-Sheet 5
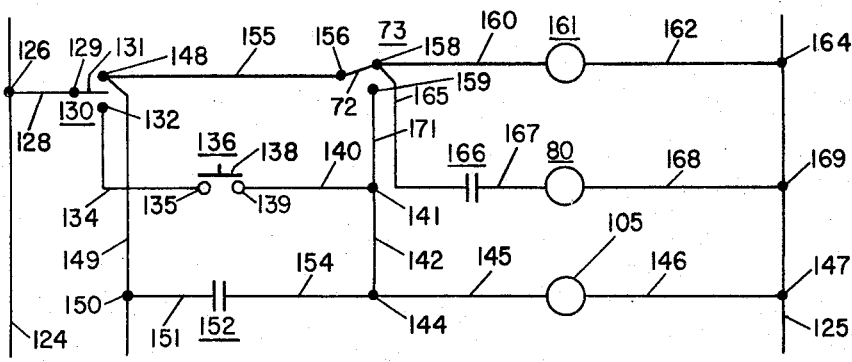
FIG. 10
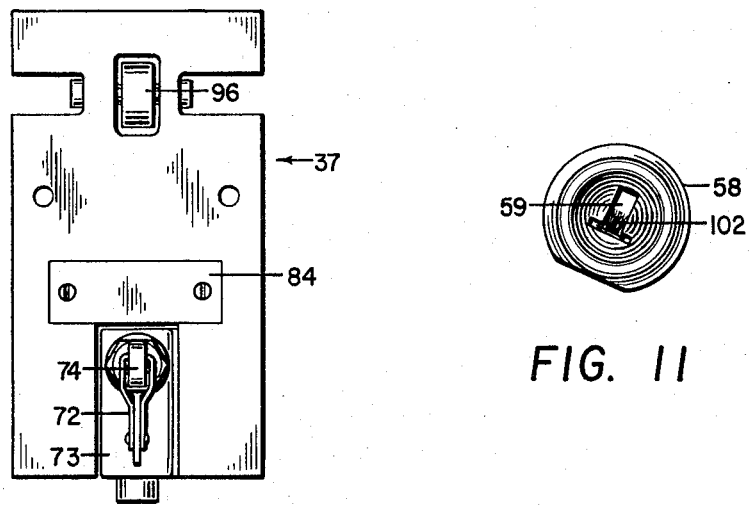
FIG. 11
FIG. 12
INVENTOR.
CHARLES J. BURGIO, JR.
BY
HIS ATTORNEYS.

United States Patent Office 3,295,195
Patented Jan. 3, 1967

3,295,195
METHOD AND MACHINE FOR INSERTING AND SECURING PILE SEAL MATERIAL IN A CHANNEL IN A BAR
Charles J. Burgio, Jr., Rochester, N.Y., assignor to The Schlegel Manufacturing Company, Rochester, N.Y., a corporation of New York
Filed Oct. 16, 1963, Ser. No. 316,650
28 Claims. (Cl. 29—411)

This invention relates to a method and machine for applying a strip of material to a structural bar, by inserting the strip in a channel in the bar and securing it therein. More particularly, this invention relates to a method and machine for inserting a strip of woven pile weatherstripping in a channel in an aluminum extrusion, and securing it therein.

During recent years, there has been widespread use of metal extrusions for manufacturing closure members. For example, extrusions of aluminum, aluminum alloys, and the like are in widespread use in the manufacture of storm doors and storm windows.

In order to improve the seal that is obtained between a closure member and the surface against which it engages, it is now a common practice to secure, to one surface of the extrusion, a length of weatherstripping. Frequently, this has been accomplished by forming the extrusion with a channel, and seating a length of pile seal weatherstripping in the channel, with the pile fibers projecting from the channel, to serve as the seal element. At first, this was done by hand, and the operation was unsatisfactory because of high labor costs, lack of uniformity in the work, and the tendency for relative movement to occur between the weather-stripping and the extrusion. The tendency for the length of pile seal material to creep relative to the extrusion created a particularly troublesome problem, because it was found that the pile seal tended to creep or shrink toward the central portion of the extrusion, away from its ends. The result was that, after a period of time had elapsed and creeping had occurred, an aluminum window, that was originally weatherstripped around its entire periphery, would be found to have gaps in its weatherstripping adjacent its corners.

In time, machines were delevolped to insert and secure weatherstripping in the channels of extrusions. However, the demands upon such a machine, from the standpoint of the manufacturer of storm doors and windows, are extremely severe, and in the past, no completely satisfactory single machine has been available. For example, the manufacturer of storm windows and doors must be prepared to fabricate from extrusions having differing crosssections, in order to meet customer demands and take advantage of different extruded shapes. The machine should be able to handle extrusions having different lengths, and must be capable of working to produce a good product, within the standard tolerance ranges for extrusions.

One object of the present invention is to provide a method and machine for applying pile seal material to a structural bar by inserting a strip of the pile seal material in a channel in the bar and securing it therein, and that is practical, easy to operate, and convenient and economical to use.

Another object of the invention is to provide a machine for inserting and securing a strip of pile seal material in a channel in an extrusion, that will handle extrusions having any desired lengths, that is compact, and that is easily cleaned and maintained.

A further object of the invention is to provide a machine of the character described that is easily modified to handle extrusions having different cross-sections.

Another object of the invention is to provide a machine of the character described that will handle extrusions effectively, efficiently, and without marring their exposed, finished surfaces.

Another and general object of the invention is to provide a machine for inserting and securing pile seal weatherstripping material in an undercut channel in an extrusion, that is fully adjustable to permit the accommodation of extrusions of different cross-sections and that have different sizes, and that will uniformly produce a satisfactory product in a practical manner, with input extrusion stock having cross-sectional dimensions that vary within standard tolerance ranges.

Other objects of the invention will be apparent hereinafter from the specification and from the recital of the appended claims. To these and other ends, the invention resides in certain improvements and combinations of parts, all as will hereinafter be more fully described, the novel features being pointed out in the claims at the end of this specification.

In the drawings:

FIG. 2 is a side elevation thereof;

FIG. 3 is a side elevation thereof, on a slightly enlarged scale, with one side wall of the structural frame removed, to show the working components of the machine;

FIG. 10 is a schematic electrical circuit diagram, showing one way in which the machine can be wired in order to accomplish its purpose;

FIG. 11 is an end view, on an enlarged scale, of the feed tube through which the pile seal material is fed; and FIG. 12 is a top plan view of the end plate for the bed of the machine.

Figure 1:
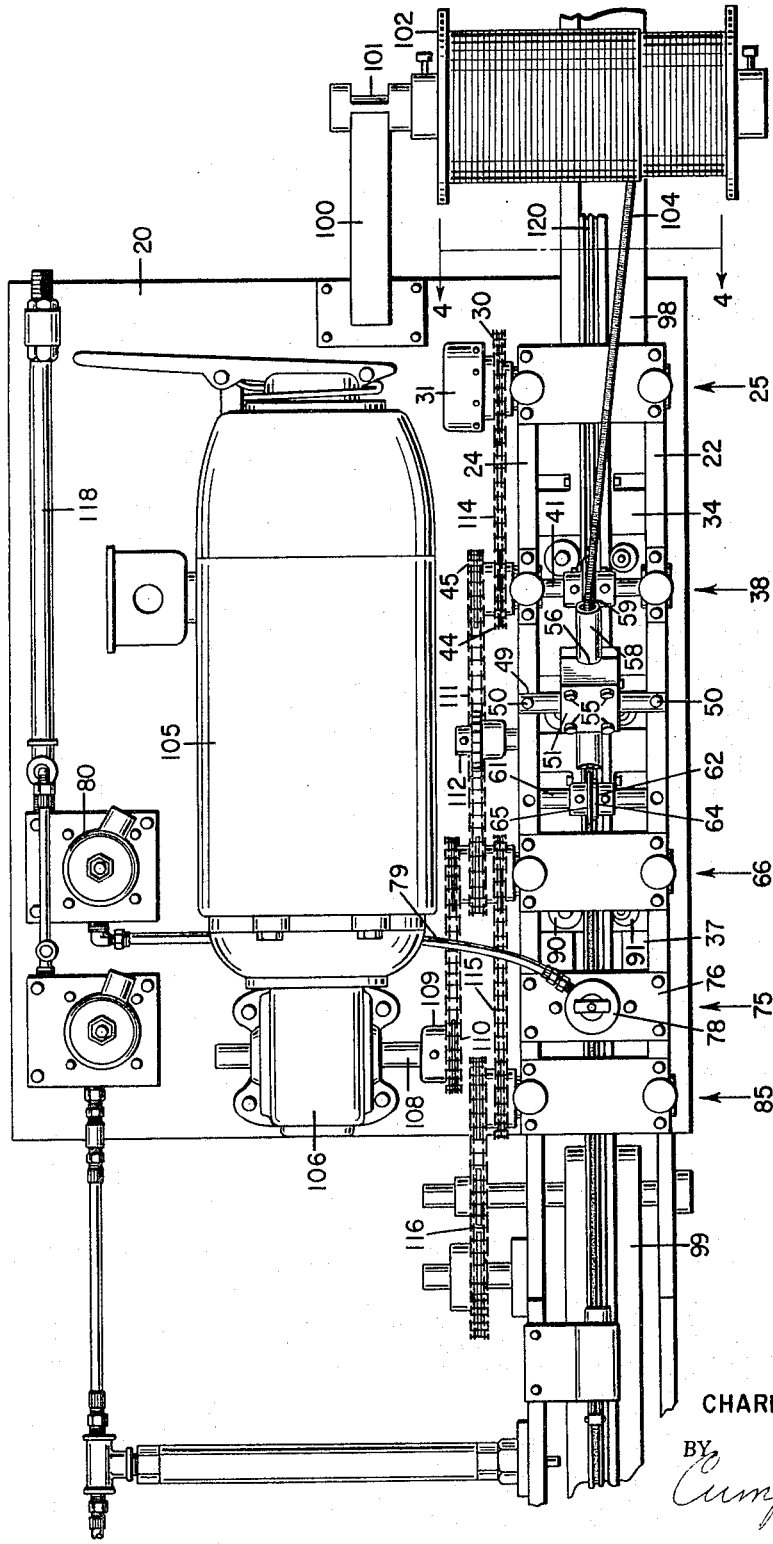
FIG. 1 is a top plan view of a machine that is constructed in accordance with one preferred embodiment of the invention, and that can be operated to apply pile seal material to structural bars such as aluminum extrusions, by inserting a strip of pile seal material in undercut channels in the bars, and securing the pile seal strip in place.
Figure 4:
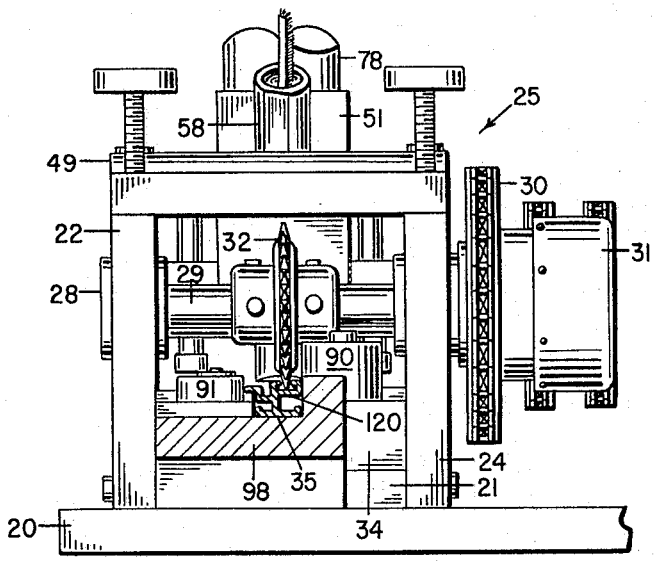
FIG. 4 is a view, on an enlarged scale, taken on the line 4—4 of FIG. 1, looking in the direction of the arrows.
Figure 5:
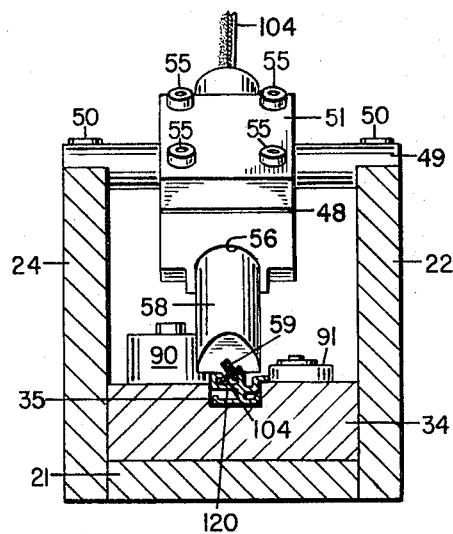
FIG. 5 is a section, on an enlarged scale, taken on the line 5—5 of FIG. 3, looking in the direction of the arrows.
Figure 6:
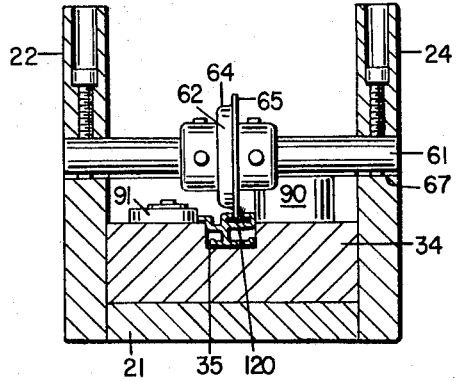
FIG. 6 is a section, on an enlarged scale, taken on the line 6—6 of FIG. 3, looking in the direction of the arrows.
Figure 7:
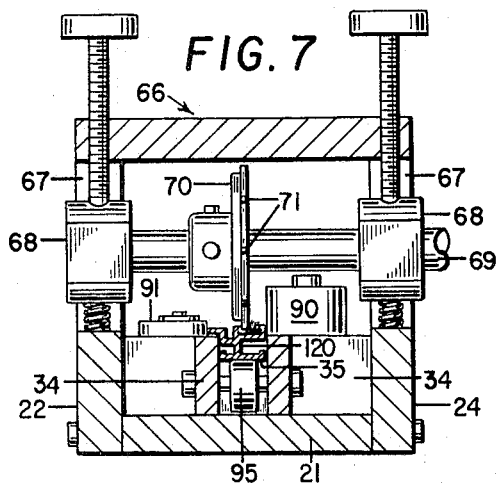
FIG. 7 is a section, on an enlarged scale, taken on the line 7—7 of FIG. 3, looking in the direction of the arrows.
Figure 9:
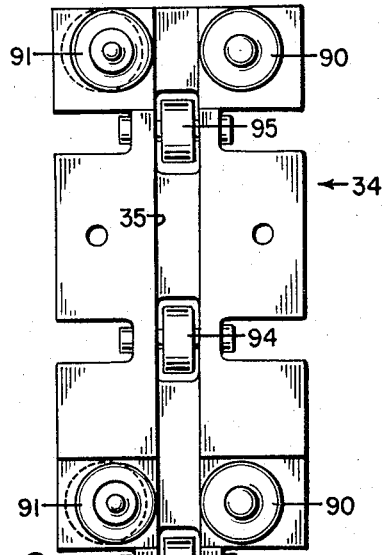
FIG. 9 is a top plan view of the bed plate of a machine that is illustrated in the preceding figures.
Figure 8:
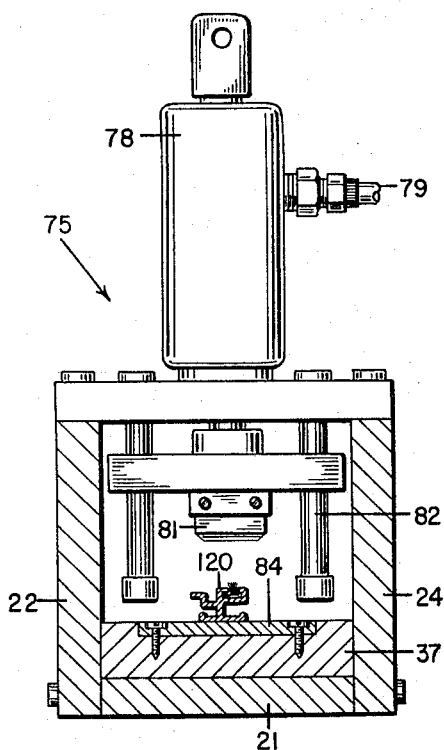
FIG. 8 is a section, on an enlarged scale, taken on the line 8—8 of FIG. 3, looking in the direction of the arrows.

In the preferred embodiment of the invention that is illustrated in the drawings, the machine comprises a frame structure that provides a work path along which the bars, such as aluminum extrusions, can be passed one after another, to be worked on by the machine. Drive means are disposed adjacent the entrance to the work path, for engaging the leading end of a bar as it is inserted in the work path, to move the bar along the work path, with the undercut channel of the bar disposed so as to permit and facilitate the insertion of the strip of pile seal material. A roll or other supply of pile seal strip is mounted on the frame for continuously supplying the strip to the machine, for insertion in the channel of each bar as it is moved along the work path.

A guide fixture is mounted on the frame in a position from which it can dispose the strip in the channel of a bar, with one edge of the strip engaged in the channel, and the other projecting from the channel. Following the guide fixture along the work path, there is a tuck-in device for inserting the projecting edge of the strip into the channel, so that only the pile projects from the channel. Next, a staking device crimps at least one edge of the channel downwardly, so as to clamp the strip in place and hold it substantially against movement relative to the bar. The circuitry of the machine is arranged so that, as the trailing end of a bar is about to leave the work path, the bar, and any following bar, are stopped, and a cutting device severs the strip in the space between the trailing end of one bar and the leading end of the succeeding bar. After the cutting operation has been completed, both bars are again placed in motion, and the first bar is ejected from the work path.

In order to insure that there will be a gap between successive bars as the bars pass through the work path, so that the cutting mechanism can sever the strip without interference from the presence of a bar, a tandem drive is provided at the entrance of the work path. A first drive mechanism engages the bar as it is brought to the entrance of the work path, and moves the bar along into the work path. A second driving mechanism, that operates at a higher rate of speed than the first drive, then engages the bar and moves it at a faster rate of speed through the work path. The first driving mechanism is provided with an overrunning clutch to permit the bar to be moved at the higher rate of speed.

Referring now in detail to the drawings by numerals of reference, the numeral 20 denotes a base on which the machine is mounted. The frame of the machine comprises a base plate 21 (FIG. 2) and a pair of side plates 22 and 24 respectively. The side plates 22 and 24 are rigidly secured at opposite sides of the base plate 21, and provide therebetween a work path.

A first drive assembly, that is generally denoted by the numeral 25, is mounted at the entrance of the work path. The side plates 22 and 24 are formed at this point with aligned recesses 26 (FIG. 2), in which a pair of pillow blocks are adjustably mounted, to permit their elevation to be adjusted. A shaft 29 (FIGS. 2 and 3) is journalled in bearings in the pillow blocks. This shaft 29 is formed to extend beyond the side plate 24, and a sprocket 30 and overrunning clutch assembly 31 are mounted on the projecting end of this shaft.

A toothed drive wheel 32 is secured on the shaft 29 intermediate the side plates 22 and 24. This drive wheel is adjusted axially of the shaft, and in elevation, so that its teeth engage in the bottom surface of the channel of a bar, such as an aluminum extrusion that has an undercut, T-shaped channel formed therein, so that upon rotation of the drive wheel, the bar is caused to move through the work path.

A guide plate or bed plate is mounted on the base plate 21, between the side walls 22 and 24. This guide plate 34 is removably held in place by a plurality of screws, so as to be easily removable. The guide plate 34 is formed with a lengthwise-extending recess 35 for guiding a bar or extrusion during its movement through the work path. A solid, hardened steel roller 36 is rotatably mounted in the guide plate 35, with its axis of rotation in the same vertical plane as the axis of rotation of the drive wheel 32. The steel roller 36 is permanently installed and is not adjustable in position. However, the drive wheel 32 is adjustable in elevation, and is spaced so that its outermost periphery is spaced from the circumference of the roller 36 just sufficiently to accommodate the work piece, and to permit it to be driven by the drive wheel as it is supported during its movement by the roller 36.

A second drive assembly 38 is mounted between the side plates 22 and 24 a short distance further along the work path. This second drive assembly is somewhat similar in structure to the first drive assembly. The side plates are formed with downwardly extending, aligned recesses 39, in which a pair of pillow blocks 40 are adjustably mounted so that their elevations can be changed. A shaft 41 is journaled in bearings in these pillow blocks, to extend transversely of the work path, and a toothed drive wheel 42 is secured to the shaft 41, in alignment with the first drive wheel, and substantially at the same elevation, for also engaging in the channel of an extrusion that is moving in the work path, to engage and to move the channel.

The shaft 41 projects through the rear side plate 24 and the pillow block that is mounted in that side plate, and a pair of sprockets, that are generally indicated in FIG. 1 by the numerals 44 and 45, are mounted on the shaft extension in axially spaced relation to each other.

A solid steel roller 46 is rotatably mounted in a recess in the guide plate 34, directly beneath the second drive wheel 42, to support a bar as it is engaged by the drive wheel.

At a further distance along the work path, the side plates are formed in their upper surfaces with a pair of transversely aligned recesses 48 (FIG. 3), that are generally semi-circular in shape. A circular shaft 49 is seated at its opposite ends in these recesses, and is formed with transverse, aligned bores at its ends, through which set screws 50 are inserted to secure the shaft to the side plates and hold the shaft against movement.

A clamping block 51 is formed with a transverse bore through which the shaft 49 is passed. This block 51 is formed with deep slits 52 and 54, in planes parallel to the axis of the shaft 49, and with four bores in its four respective corners, to extend into the block at right angles to the slits. These bores are threaded to receive the set screws 55, to control the clamping action.

The block is also formed with a bore 56 of generally cylindrical shape, and a tubular guide member 58 is seated in this bore, with its opposite ends projecting from either side of the block. The position of the tubular guide member 58 can be adjusted within the bore 56 both axially and angularly, by loosening the set screws and moving the member 58 about, as desired.

The tubular guide member 58 is formed with a lengthwise-extending bore 59 that is generally T-shaped in cross-section, to accommodate therein a strip of woven pile weatherstripping. At its lower end, the tubular guide member 58 is formed with a relieved lower surface 60, to permit the dispensing or discharge end of the bore 59 to be disposed in close confronting relation to the surface of a bar that is being moved through the work path, immediately above the channel in the bar. Preferably, the upper surface of the tubular guide member is also relieved or cut back, to permit visual inspection of the operation.

The combination of the shaft 49, clamping block 51, and tubular guide member 58 together provides a fixture for guiding the pile seal strip into place on the bar as it moves through the work path. Preferably, the tubular guide member 58 is mounted with its bore 59 in a canted position, to dispose the strip in the channel with one edge of the strip engaged in the channel and the other projecting from the channel.

A short distance along the work path from the strip dispensing fixture, a shaft 61 is secured between the two side plates, to extend transversely of the work path. A wheel 62 is rotatably mounted on this shaft. This wheel 62 is formed adjacent its periphery with a flange 64, and with a circumferentially extending, radially-projecting thin, tapered disc portion 65. This disc portion 65 is disposed for sliding movement along one wall of the channel of a bar that is being moved through the work path, to tuck in the projecting edge of the pile seal strip, to complete the insertion of the strip within the channel in the bar, so that only the pile fibers project from the channel. The wheel 62 is mounted for limited axial movement relative to the shaft 61, to permit the disc 65 to follow the channel wall despite minor dimensional deviations in the wall. Preferably, the wheel 62 is spring-pressed, in a manner not shown in the drawings, so that the disc portion 65 of the wheel is positioned at the location where the wall of the channel should be if it were completely true.

A short distance further down the work path from the tuck-in wheel 62, a staking assembly 66 is disposed. The side plates 22 and 24 are formed at this point with a pair of downwardly-extending, transversely aligned recesses 67, and a pair of pillow blocks 68 are mounted in these recesses, in transverse alignment, and for adjustment in elevation. A shaft 69 is journaled in bearings that are mounted in these pillow blocks. A staking wheel 70, that is formed with a plurality of angularly spaced, radially projecting staking teeth 71 about its periphery, is secured on the shaft 69. The staking wheel is located transversely of the work path in position to engage one wall of the bar, above the channel, and the teeth 71 are disposed to crimp in the wall at spaced locations along its length, to clamp the woven pile seal strip in place in the channel, to secure it substantially against movement relative to the bar. Preferably, the teeth 71 are disposed so that any marks on the exposed bar surface are close to the channel, and are partly or fully concealed by the pile.

The shaft 69 is formed with an end that projects through the rear side plate, and three sprockets are secured to the projecting end of the shaft, in axially spaced relation to each other.

Down the work path from the staking wheel, the guide plate 34 is formed with an opening, and a microswitch 73 is mounted in this opening, with its armature 72 projecting upwardly, and with a roller 74 mounted at the upper end of its armature 72. The roller 74 is disposed to project upwardly into the path of a bar that is moving through the work path, and is arranged so that when it is engaged by the leading end of a moving bar, the armature 72 will be depressed, to shift the position of the switch. The armature 72 is spring pressed upwardly, so that as the trailing end of a moving bar passes over the roller 74 and releases it, the armature 72 will spring upwardly, again to shift the position of the switch.

A cutting assembly, that is generally indicated by the numeral 75, is mounted transversely of the work path, slightly down the work path from the microswitch armature 72 and roller 74. This cutting assembly 75 comprises a mounting plate that is secured in a pair of transversely aligned recesses in the side plates, to extend transversely of the work path. An air cylinder 78 is mounted on the upper surface of the mounting plate 76. This air cylinder is connected through an air supply line 79 to a solenoid valve 80. The piston rod of the air cylinder 78 projects through an opening (not shown) in the mounting plate 76, and a blade 81 is mounted on the lower end of the piston rod, transversely of the work path. The blade 81 is formed to ride up and down in sliding engagement with a pair of posts 82, that hold the blade against movement angularly of the work path. The guide plate 34 is formed, directly beneath the blade 81, with a hardened steel insert 84, against which the edge of the blade can engage, at the lower extremity of its downward movement.

An ejecting drive assembly, that is generally denoted in the drawings by the numeral 85, is mounted at the discharge end of the work path. The side plates are formed, adjacent the discharge end of the work path, with downwardly extending, transversely aligned recesses 86. A pair of pillow blocks 88 are seated in these recesses respectively, and are mounted to be adjustable in elevation. A shaft 89 is journaled in bearings in these pillow blocks, and extends transversely of the work path. A rubber-surfaced wheel 90 is secured on the shaft 89, and is disposed to engage the bar, to move the bar through the work path and eject it from the work path, upon rotation of the shaft 89. The shaft 89 is formed with an extension that projects through the pillow block that is mounted in the recess in the rear side plate 24, and a pair of sprockets are mounted on the projecting end of the shaft, in axially spaced relation relative to each other.

At spaced locations along the work path, and in alignment with each other, there are mounted a plurality of pairs of guide wheels, and in the drawings, the wheels in each pair are denoted by the same numerals, 90 and 91 respectively. Each of the guide wheels 90 is mounted for rotation about an upright axis, at a fixed location, and all of the fixed guide wheels 90 are disposed for tangency to a common plane. Each of the guide wheels 91 is also mounted for rotation about an upright axis, but each wheel is mounted so that it can yield radially, in a resilient manner, to permit accommodation of minor dimensional variations in work pieces, and resiliently to engage the work piece against the fixed guide wheels 90.

The guide plate 34 is also formed with recesses at each of the work zones in which the tuck-in wheel 62, the staking wheel 70, and the ejection wheel 90 are mounted, and fixed, hard steel rollers 94, 95 and 96 respectively are mounted for rotation beneath each of these wheels. These rollers support the bar during its movement through the work path, as it is acted on by each of the respective functioning wheels.

At the feed or entrance end of the work path, an apron 98 may be mounted, that is formed with a shoulder to guide each bar to the entrance of the work path to facilitate feeding work pieces into the work path. At the discharge end of the work path, a conveyor 99 is disposed, to carry away work pieces that have been ejected from the work path.

A bracket 100 is secured to the base 20, to support a spindle arrangement 101 on which a supply roll 102 is rotatably mounted. The supply roll 102 carries a spool of pile seal strip material 104, one end of which is threaded through the bore 59 in the tubular guide member 58, to be dispensed for application to a work piece during operation of the machine.

A brake-motor 105 is mounted on the base 20 to drive the machine. The drive shaft of the motor is connected through a gear box 106 to a drive shaft 108, at the end of which a sprocket 109 is mounted. As shown in FIG. 1, a chain 110 is mounted around the sprocket 109, and is looped around the outermost sprocket of the three sprockets that are mounted on the projecting end of the shaft 69 at the staking assembly 66. Other chains interconnect this chain and sprocket arrangement, in order to drive the various parts of the machine as needed. To this end, a chain 111 interconnects sprockets on the staking wheel shaft 69 and on the second drive assembly shaft 41, and an idler sprocket 112 is mounted on a stub shaft that projects from the side plate 24, to guide this chain. Another chain 114 is looped around the sprocket 44 on the second drive assembly shaft 41, and around the sprocket 30 on the first drive assembly shaft 29. The sprocket sizes are arranged so that the second drive assembly shaft 41 is turned at a higher rate of speed than the first drive assembly shaft 29, when the chain is driven.

Still another length of chain 115 interconnects the third and innermost sprocket on the projecting end of the staking wheel shaft 69 and a sprocket on the projecting end of the ejecting drive wheel shaft 89. A second sprocket on the ejecting wheel shaft 89 is interconnected by a chain 116 with a sprocket that is mounted on a shaft that is arranged to drive the conveyor 99.

A compressed air supply line 118 is mounted on the base 20 and is connected to the solenoid-controlled valve 80, to supply air to operate the cutting assembly 75, and any other accessories for the machine that may be operated by compressed air.

The machine is arranged to operate in the following manner. An operator inserts a length of an aluminum extrusion 120, or other work piece, in the proper alignment, into the entrance to the work path. The apron 98 may be provided with any appropriate shoulders or other guide members to facilitate the insertion of the work piece in the proper alignment. As the work piece enters the running machine, it is engaged by the drive wheel 32 of the first drive assembly, and the work piece should then be released by the operator. The work piece or extrusion 120 is then moved by the action of the first drive wheel 32 lengthwise through the work path until it is engaged by the second drive wheel 42.

Since the second drive wheel 42 is being rotated at a higher rate of rotation than is the first drive wheel 32, the work piece immediately begins to move at a higher rate of speed than that at which the first drive wheel 32 is being driven. Since the work piece and the first drive wheel 32 remain engaged, the work piece tends to cause the first drive wheel 32 to rotate at the same rate of speed as the second drive wheel 42, and this is permitted by the overrunning clutch 31, which permits the first drive wheel 32 and its shaft 29 to rotate at a faster rate than that at which it would be driven by its drive sprocket 30.

As the work piece is moved beneath the discharge end of the tubular guide member 58, the strip 104 of pile seal strip is fed into the channel in the work piece. As the strip leaves the tubular guide member, it is canted, so that one edge of the strip projects into and engages in the channel, at one side of the channel, and the other edge of the strip projects out of the other side of the channel, overlapping the channel wall slightly.

As the work piece continues its movement through the work path, the projecting edge of the strip is thrust down into the channel by the disc portion 65 of the tuck-in wheel 62, so that only the pile fibers project from the channel. The work piece, with the inserted strip, then passes under the staking wheel 70, whose teeth stake down the wall of the channel at spaced locations along the length of the work piece, to secure the strip in place mechanically, to hold it against movement relative to the work piece.

As the work piece passes through the discharge end of the work path, it is engaged by the ejection wheel 90. The soft rubber surface of this wheel engages the work piece frictionally and does not mar its finish, as it continues to move the work piece through the work path.

When the trailing end of a work piece passes through the entrance to the work path, the operator ordinarily will be waiting with a fresh work piece, ready for insertion in the machine. If the operator, as will ordinarily happen, places the second work piece in abutting engagement with the trailing end of the first work piece, the two work pieces will remain engaged until the second work piece is engaged by the first drive wheel 32. Then, since the first drive wheel is moving at a lower rate of rotation than the second drive wheel 42, the first work piece will move, at its higher rate of speed, away from the leading end of the second work piece. Ordinarily, a gap of several inches will be provided in this way. When the second work piece becomes engaged by the second drive wheel 42, it will then move at the same rate of speed as the first work piece, but the gap between the two work pieces will have been provided, for a purpose to be described presently, and will remain constant during the remainder of the travel of the two work pieces, in the work path. The strip 104 is continuously dispensed from the tubular guide member 58, and extends through the gap between work pieces, until the strip begins to be dispensed into the channel in the second work piece.

As the trailing end of the first piece disengages the roller 74 that is mounted at the upper end of the microswitch armature 72, the armature 72 is spring pressed upwardly, to shift the position of the microswitch. In a manner that will be described in greater detail presently, this operates the solenoid valve 80 to admit air to the air cylinder 78, and the knife blade 81 is driven down. The gap between the work pieces permit the blade to cut the strip that extends across the gap, and this leaves a short overhanging piece of the strip at each end of each work piece that goes through the machine.

The circuitry is arranged so that the drive is stopped when the knife is operated. Thus, both work pieces stop during the cutting operation. After the cutting operation, the drive resumes, and the assembly is ejected from the work path by the ejection wheel 90. The assembly may be transferred from the conveyer 99, that picks it up at the discharge end of the conveyer, into a materials handling container, or it may be treated in any other convenient manner. The cycle that has just been described is repeated over and over again, as long as fresh work pieces are fed into the machine.

One way in which the circuitry for the machine can be arranged, in order to have the machine accomplish its purposes, is as follows. Referring now particularly to FIG. 10, the lines 124 and 125 supply 115 v. A.C. power to the machine. The line 124 is connected through a junction 126 with a line 128, that is connected to one terminal 129 of a master switch 130. The armature 131 is connected to the terminal 129.

The master switch 130 is a single pole, double throw "center-off" switch, and therefore has three terminals, and a center, off position. A second of these terminals, that is denoted by the numeral 132 in the drawings, is connected through a line 134 to one terminal 135 of a "jog" switch 136. The armature 138 of the jog switch is disposed for operation by a push button, and when closed, connects the terminal 135 to the second terminal 139 of the switch.

The jog switch terminal 139 is connected through a line 140 to a junction 141. This junction is connected through a line 142 to another junction 144; and the junction 144 is connected through a line 145 to one terminal of the motor 105, the other terminal of which is connected to a junction 146 on the power supply line 125.

The third terminal 148 of the master switch 130 is connected through a line 149 to a junction 150. The junction 150 is connected through a line 151 to one terminal of a time delay relay 152. The other terminal of this relay is connected through a line 154 to the junction 144.

The terminal 148 of the master switch 131 is also connected through a line 155 with one terminal 156 of the microswitch 73. The armature 72 of this microswitch is mounted for movement between the two microswitch terminals 158 and 159. The microswitch is normally closed, with the armature 72 engaged against the terminal 158. The microswitch terminal 158 is connected through a line 160 with one terminal of a delay relay 161, the other terminal of which is connected through a line 162 to a junction 164 that is connected to the power supply line 125.

The microswitch terminal 158 is also connected through a line 165 with one terminal of a delay relay 166, the other terminal of which is connected through a line 167 with one terminal of the coil of the solenoid valve 80, the other terminal of which is connected through a line 168 to the junction 169, that is connected to the power supply line 125.

The other terminal 159 of the microswitch 73 is connected through a line 171 with the junction 141.

The operation of the circuitry will now be described as though the operator were about to place the machine in operation. First, the armature 131 of the master switch 130 is moved from its center, "off" position, to make contact with the terminal 132, which would be the "jog" position of the switch. An aluminum extrusion, constituting the first work piece, would then be placed at the entrance to the work path of the machine, and engaged lightly against the first drive wheel 32. The operator would then depress the "jog" button, to move the armature 138 of the jog switch 136. This would make a circuit from the power supply line 124, through the junction 126, the line 128, the master switch terminal 129, armature 131, and terminal 132, through the line 134, the jog switch terminal 135, armature 138, and terminal 139, through the line 140 to the junction 141; and from the junction 141 through the line 142, the junction 144, the line 145, the motor 105, the line 146, and the junction 147 to the power supply line 125. Thus, when the jog switch armature 138 is depressed to close the jog switch, the motor is operated so that the drive wheels 32 and 42 are operated, to move the work piece along the work path. The drive continues to operate as long as the jog switch remains closed.

The first work piece is jogged forward in the work path until the leading end of the work piece projects slightly beyond the dispensing end of the tubular guide member 58. The operator then inserts an end of the pile seal strip into the channel in the work piece, with one edge in the channel and the other edge projecting from the channel, in order to start the proper threading of the strip into the channel. The jogging is then continued until the leading end of the work piece has passed at least under the tuck-in wheel 62, which completes the insertion of the strip into the channel of the work piece. Thereafter, the strip normally will continue to feed out at the proper rate from the tubular guide member 58, as the machine is operated. Accordingly, the operator then shifts the armature 131 of the master switch 130 from its "jog" position to the "on" position in which the armature 131 engages against the switch terminal 148.

When the master switch armature 131 is engaged against the switch terminal 148, a circuit is made from the master switch terminal 128 through the switch armature 131 and the switch terminal 148, through the line 155, the microswitch terminal 156, the microswitch armature 72, the microswitch terminal 158, the line 160, through the time delay relay 161, and the line 162 to the junction 164, which is in contact with the power supply line 125. A circuit is also made from the microswitch terminal 158 through the line 165, the time delay relay 166, the line 167, the coil of the solenoid valve 80, the line 168, and the junction 169, to the power supply line 125.

The time delay relays 161, 166 and 152 are arranged so that, when the two circuits are closed that have just been described, the normally closed relay 166 operates the solenoid valve 80 to drop the cut-off knife blade 81, which is immediately returned to its up position by its spring return. The relay 161 then operates to open the normally closed relay 166, and to close the normally open relay 152. This energizes the motor, after a suitable delay of a second or of a few seconds, and the drive wheel 42 rotates to move the work piece along the work path. As the work piece continues its movement through the work path, the strip is continuously dispensed into the channel in the work piece, and is staked in place by the action of the staking wheel 70.

When the leading end of the work piece engages the roller 74 that is mounted at the upper end of the microswitch armature 72, the roller 74 is depressed, to depress the microswitch armature and shift the position of the microswitch, so that the armature 72 becomes disengaged from the microswitch terminal 158 and makes contact with the terminal 159. This closes a new circuit to the motor, from the microswitch terminal 159, through the line 171, the junction 141, the line 142, the junction 144, the line 145, the motor 105, the line 146, and the junction 147 that is in contact with the power supply line 125.

As the work piece continues its movement through the work path, it is engaged by the ejection wheel 90, which moves it through the work path first in cooperation with the second drive wheel 42, and then alone. When the trailing end of the work piece disengages the roller 74, the microswitch arm 72 is spring pressed to return upwardly, to shift the microswitch armature 72 so that it disengages the terminal 159 and reengages the terminal 158. When this occurs, the circuitry is arranged so that there are no complete circuits to the motor, and the motor stops. However, the time delay relay 161 is energized, and it operates as before, to energize the coil in the solenoid valve 80, to actuate the air cylinder 78 to cause the guillotine blade 81 to be forced down, to cut the strip that is trailing along behind the trailing end of the work piece. After the blade returns, the time delay relay 161 operates, after a sightly, adjustable delay period, to close the relay 152, again to energize the motor. Ordinarily, during the operation of the machine, a second work piece would have been inserted immediately following the first one, and because of the operation of the two drive wheels at differential speeds, a gap would have been provided between the trailing end of the first work piece and the leading end of the second work piece, so that the cutting action will occur in this gap.

The operation of the machine would then continue, going through cycle after cycle, as just described, stopping once during the passage of each work piece through the machine, to permit cutting of the strip to occur between the work pieces.

The machine will find great application in the fabrication of aluminum storm windows and doors, for applying weatherstripping to the parts of these items. Substantially any desired cross-section of material can be handled in the machine. Ordinarily, the channel in the extrusion will be generally in the shape of an inverted T; and the pile seal strip will have a substantially similar shape, and will comprise a backing material of fabric, with woven pile fibers disposed to project from one surface of the fabric strip, and with marginal edge portions of the strip free from fiber. Preferably, the fabric of the pile seal strip has a backing coating of a plastic material such as, for example, polyethylene or polypropylene, or the like, to improve its characteristics.

Although the machine can be used to stake the strip in place along both of its marginal edge portions, it is preferred that the staking be effected along only one side of the strip, and preferably, on the side of the work piece that has greatest support and therefore greatest strength, to resist distortion.

One of the important features of the machine is that the strip dispensing fixture can handle a plastic-coated or plastic-backed trip, without becoming jammed or clogged, if the coating or backing tends to abrade or peel off gradually. Moreover, the tubular dispensing member for the strip is easily dismantled for cleaning, and is easily adjusted to dispense the strip properly in its canted position, with one marginal edge of the strip inserted in the channel, so that the machine need tuck in only one side of the strip.

The automatic cutting of the strip is an important advantage of the machine. High speed operation is permitted, while the technique of cutting the strip in the unsupported reach of the strip between succeeding work pieces insures that the entire channel in each work piece will be filled with inserted strip.

Machine speeds of 100 feet per minute or higher are feasible. The machine can handle extrusions of any desired length, and extrusions of varying cross-sections are easily accommodated simply by substituting in the machine a guide plate or bed plate having the necessary configuration, and adjusting the heights of the several operating wheels as necessary.

The machine inserts strip accurately and at a high rate of speed. It is easy to operate, and accomplishes its purpose effectively and reliably. It is compact, and its action is such that it does not mar exposed, finished work piece surfaces. The staking is effective to prevent creep of the pile seal strip, thus insuring positive corner seals when the stripped extrusions are fabricated into windows and doors. Moreover, the machine will handle extrusions whose dimensions vary within standard tolerances, and the machine is fully adjustable to insure accuracy of the work.

While the machine could be arranged to cut the unsupported strip so close to the trailing end of the work piece as to be "at" the end of the work pice, it is preferred to permit a free overhang of at least one inch, in order to simplify the design, construction, and operation of the machine. However, in the claims that follow, it should be understood that the term "adjacent" when used to refer to the position of cutting relative to the trailing end of the work piece, contemplates not only cutting at a position remote from the trailing end of the work piece, but also a cutting position so close to the end of the work piece as to be "at" the end of the work piece.

While the invention has been disclosed herein by reference to the details of a preferred embodiment thereof, it is to be understood that such disclosure is intended in an illustrative, rather than in a limiting sense, and it is contemplated that various modifications in the construction and arrangement of the parts will readily occur to those skilled int he art, within the spirit of the invention and the scope of the appended claims.

I claim:

1. A machine for applying pile seal material to a structural bar by inserting a strip of pile seal material in an undercut channel in the bar and securing it therein, comprising:
   a frame structure providing a path along which each bar can be passed as it is worked on by the machine;
   drive means for engaging the leading end of a bar as it is inserted in the work path and for moving the bar along the path with the channel of the bar disposed to receive the strip;
   means for continuously supplying strip to the channel in the bar, and for disposing the strip in the channel with one edge of the strip engaged in the channel and the other projecting therefrom;
   means for inserting the projecting edge of the strip in the channel so that the pile projects from the channel;
   means for securing the inserted strip in place in the channel, substantially against movement relative to the bar;
   means for severing the inserted strip adjacent the trailing end of the bar, and
   means for ejecting the assembly from the work path.

2. A machine in accordance with claim 1 including means for stopping a bar with its trailing end adjacent the discharge end of the path, and
   means operative after the bar has been stopped for actuating said severing means.

3. A machine in accordance with claim 1 including means disposed adjacent the discharge end of the path and actuated by the passage of the trailing end of a bar for stopping the bar, and
   means operative after the bar has been stopped for actuating said severing means, for severing the strip intermediate the trailing end of the bar and the leading end of a following bar.

4. The machine of claim 1 wherein said inserting means comprises a fixture for receiving and dispensing said strip into said channel, said strip having a ribbon-like backing and a thick fiber pile upstanding from one surface of said backing over a central section thereof, with lateral marginal sections of said strip being free from pile, said fixture comprising: a tube that is formed with a bore of substantially uniform cross-section therethrough that conforms to the cross-sectional shape of said strip and in which said strip can be snugly and slidably engaged, to permit free passage of said strip therethrough, and means for mounting said tube to dispense said strip therefrom into said channel, with the angle between said tube bore and said bar being less than 90°, said tube being relieved at its dispensing end to permit the dispensing end of said bore to be placed in close proximity to said bar.

5. A machine for applying pile seal material to a structural bar by inserting a strip of pile seal material in an undercut channel in the bar and securing it therein, comprising:
   a frame structure providing a path along which each bar can be passed as it is worked on by the machine;
   drive means for engaging the leading end of a bar as it is inserted in the work path and for moving the bar along the path with the channel of the bar disposed to receive the strip;
   means for continuously supplying strip to the channel in the bar;
   means for inserting the strip in the channel with the pile projecting from the channel;
   means for securing the inserted strip in place in the channel, substantially against movement relative to the bar;
   means for stopping a bar with its trailing end adjacent the discharge end of the path;
   means operative after the bar has been stopped for actuating said severing means, and
   means for ejecting the assembly from the work path after the strip has been severed.

6. A machine in accordance with claim 5, wherein
   said means for stopping the bar is disposed adjacent the discharge end of the path and is actuated by the passage of the trailing end of the bar to stop the bar, and
   said means operative after the bar has stopped for actuating said severing means operates to sever the strip intermediate the trailing end of the bar and the leading end of a following bar.

7. A feeding device for a machine for inserting pile seal strip in bars that are formed with channels, which machine provides a work path along which the bars can be passed one by one, in succession, comprising:
   first drive means for engaging the leading end of a bar that is inserted in the work path and for moving the bar along the path, and
   second drive means for engaging the leading end of a bar after it has been moved a distance along the path by said first drive means, said second drive means being arranged for moving the bar at a higher rate of speed than said first drive means, and
   means permitting the bar to move at a greater rate of speed than driven by said first drive means, thereby to permit said successive drive means to operate to space the trailing end of one bar from the leading end of a following bar, to space from each other successive bars that are fed to the machine along its work path.

8. A feeding device in accordance with claim 7 wherein said drive means comprise rotary toothed members that engage in the channel of a bar.

9. A machine for applying pile seal material to a structural bar by inserting a strip of pile seal material in an undercut channel in the bar and securing it therein, comprising:
   a frame structure providing a path along which each bar can be passed as it is worked on by the machine;
   first drive means for engaging the leading end of a bar that is inserted in the path and for moving the bar along the path;
   second drive means for engaging the leading end of the bar after it has been moved a distance along the path by said first drive means, said second drive means being arranged for moving the bar at a higher rate of speed along the path than said first drive means;

means permitting the bar to move along said path at a greater rate of speed than driven by said first drive means, thereby to permit said successive drive means to operate to space the trailing end of one bar from the leading end of a following bar, to space from each other successive bars that are fed into the machine along its work path;

means for continuously supplying strip to the channel in the bar, and for disposing the strip in the channel with one edge of the strip engaged in the channel and the other projecting therefrom;

means for inserting the projecting edge of the strip in the channel so that the pile projects from the channel;

means for securing the inserted strip in place in the channel, substantially against movement relative to the bar;

means for severing the inserted strip adjacent the trailing end of the bar and in the space between the trailing end of the bar and the leading end of a following bar, and means for ejecting the assembly from the work path.

10. A machine in accordance with claim 9 including means for stopping a bar with its trailing end adjacent the discharge end of the path, and means operative after the bar has been stopped for actuating said severing means.

11. A machine in accordance with claim 9 including means disposed adjacent the discharge end of the path and actuated by the passage of the trailing end of a bar for stopping the bar, and means operative after the bar has been stopped for actuating said severing means.

12. A machine for applying pile seal material to a structural bar by inserting a strip of pile seal material in an undercut channel in the bar and securing it therein, comprising:

a frame structure providing a path along which each bar can be passed as it is worked on by the machine;

first drive means for engaging the leading end of a bar that is inserted in the work path and for moving the bar along the path;

second drive means for engaging the leading end of a bar after it has been moved a distance along the path by said first drive means, said second drive means being arranged for moving the bar at a higher rate of speed than said first drive means;

means permitting the bar to move at a greater rate of speed than driven by said first drive means, thereby to permit said successive drive means to operate to space the trailing end of one bar from the leading end of a following bar, to space from each other successive bars that are fed to the machine along its work path;

means for continuously supplying strip to the channel in the bar;

means for inserting the strip in the channel with the pile projecting from the channel;

means for securing the inserted strip in place in the channel, substantially against movement relative to the bar;

means for stopping a bar with its trailing end adjacent the discharge end of the path;

means operative after the bar has been stopped for actuating said severing means, for severing the strip intermediate the trailing end of the bar and the leading end of the following bar, and means for ejecting the assembly from the work path after the strip has been severed.

13. In a machine for applying to a structural bar a strip of pile material that has a flat, ribbon-like backing and a thick fiber pile upstanding from one surface of said backing over a central section thereof, with lateral marginal sections of said strip being free from pile, said machine being arranged for inserting said strip into an undercut channel in said bar and securing said strip therein, a fixture mounted on said machine and formed for receiving and dispensing said strip into said channel as said bar is moved along a work path within said machine, said fixture comprising: a tubular member that is formed with a bore of substantially uniform cross-section therethrough that conforms to the cross-sectional shape of said strip and in which said strip can be snugly and slidably engaged to permit free passage of said strip therethrough, a shaft that can be mounted on said machine transversely of said workpath, and a clamp that is mounted on said shaft for movement axially and angularly of said shaft, and that can be secured to said tubular member at any desired location along the length of said tubular member, and as to which the position of said tubular member is angularly adjustable.

14. A machine for applying pile seal material to a structural bar by inserting a strip of pile seal material in an undercut channel in the bar and securing it therein, comprising:

a frame structure providing a path along which each bar can be passed as it is worked on by the machine;

drive means for engaging the leading end of the bar as it is inserted in the work path and for moving the bar along a path with the channel of the bar disposed to receive the strip;

a shaft that is mounted on the frame to extend transversely of the work path;

a tubular member that is formed with a bore of substantially uniform cross-section therethrough that conforms to the cross-sectional shape of the strip and in which the strip can be snugly and slideably engaged, to permit free passage of the strip therethrough;

a clamp that is mounted on the shaft and that is adjustable in position axially and angularly of the shaft, and that can be secured to the tubular member at any desired location along the length of the tubular member, and as to which the position of the tubular member is angularly adjustable;

said tubular member being relieved at its dispensing end to permit the dispensing end of the bore to be placed in close proximity to the channel in the bar;

said clamp and tubular member being arranged for dispensing the strip into the channel of the bar with one edge of the strip engaged in the channel and the other projecting therefrom;

means for inserting the projecting edge of the strip in the channel so that the pile projects from the channel;

means for securing the inserted strip in place in the channel, substantially against movement relative to the bar;

means for severing the inserted strip adjacent the trailing end of the bar, and means for ejecting the assembly from the work path.

15. A machine in accordance with claim 14 wherein said drive means comprises first drive means for engaging the leading end of a bar that is inserted in the work path and for moving the bar along the path, and second drive means for engaging the leading end of a bar after it has been moved a distance along the path by said first drive means, said second drive means being arranged for moving the bar at a higher rate of speed than said first drive means, and means permitting the bar to move at a greater rate of speed than driven by said first drive means, thereby to permit said successive drive means to operate to space the trailing end of one bar from the leading end of a following bar, to space from each other the successive bars that are fed to the machine along its work path, means disposed adjacent the discharge end of the path and actuated by the passage of the trailing end of a bar for stopping the bar, and means operative after the bar has been stopped for actuating said severing means, for severing the strip intermediate the trailing end of the bar and the leading end of the following bar.

16. A machine for applying pile seal material to a structural bar by inserting a strip of pile seal material in an undercut channel in the bar and securing it therein, comprising:

a frame structure comprising a bed plate that is formed with a guide channel for receiving a bar and guiding it through a work path along which the bar can be passed as it is worked on by the machine, and a pair of upstanding side plates at each side of the bed plate, rotary drive wheel means for engaging the leading end of a bar as it is inserted in the work path and for moving the bar along the path with the channel of the bar disposed to receive the strip, means for continuously supplying strip to the channel and the bar, rotary tucking wheel means for inserting the strip in the channel with the pile projecting from the channel, rotary staking wheel means for pressing portions of the bar into clamping engagement with the strip at spaced location along the length of the bar adjacent the channel, means disposed adjacent the discharge end of the path and actuated by the passage of the trailing end of a bar for stopping the bar, and means operative after the bar has been stopped for actuating said severing means, for severing the strip intermediate the trailing end of the bar and the leading end of a following bar.

17. A machine in accordance with claim 16 wherein said rotary drive wheel means and said staking wheel means are individually adjustable in elevation relative to said bed plate.

18. A machine in accordance with claim 16 wherein said bed plate is readily removable from the frame for interchange with other bed plates that are formed to accommodate bars of different respective configurations in cross-section.

19. A machine for applying pile seal material to a structural bar by inserting a strip of pile seal material in an undercut channel in the bar and securing it therein, comprising:

a frame structure providing a path along which each bar can be passed as it is worked on by the machine, and comprising a bed plate that is formed with a guide channel for receiving a bar and guiding it through the work path, and a pair of upstanding side plates at each side of the bed plate, rotary drive wheel means for engaging the leading end of a bar as it is inserted in the work path and for moving the bar along the path with the channel of the bar disposed to receive the strip, means for continuously supplying strip to the channel in the bar, and for disposing the strip in the channel with one edge of the strip engaged in the channel and the other projecting therefrom, rotary tucking wheel means for inserting the projecting edge of the strip in the channel so that the pile projects from the channel, rotary staking wheel means for pressing portions of the bar into clamping engagement with the strip at spaced locations along the length of the bar adjacent the channel, to hold the strip in the channel substantially against movement relative to the bar, means for severing the inserted strip adjacent the trailing end of the bar, and means for ejecting the assembly from the work path.

20. A machine in accordance with claim 19 wherein said means for continuously supplying strip to the channel and for disposing the strip in the channel comprises a tubular member that is formed with a bore of substantially uniform cross-section therethrough that conforms to the cross-sectional shape of the strip and in which the strip can be snugly and slideably engaged, to permit free passage of the strip therethrough, and means for mounting said tubular member to dispense the strip therefrom into the channel of the bar, with the angle between the bore of the tubular member and the surface of the bar being less than 90°, said tubular member being relieved at its dispensing end to permit the dispensing end of the bore to be placed in close proximity to the confronting surface of the bar.

21. A machine in accordance with claim 19 wherein said rotary tucking wheel means comprises at least one wheel that is mounted on a shaft that is secured to said side plates, and that is disposed to engage against one side wall of the channel in said bar, said tucking wheel being mounted for limited axial movement on its shaft to permit it to ride against said channel wall despite small dimensional deviations in the channel wall.

22. A machine in accordance with claim 19 wherein said rotary drive wheel means comprises first drive wheel means for engaging the leading end of a bar that is inserted in the work path and for moving the bar along the path, and second drive wheel means for engaging the leading end of the bar after it has been moved a distance along the path by said first drive wheel means, said second drive wheel means being arranged for moving a bar at a higher rate of speed than said first drive wheel means, and means permitting the bar to move at a greater rate of speed than driven by said first drive means, thereby to permit said successive drive wheel means to operate the space the trailing end of one bar from the leading end of a following bar, to space from each other successive bars that are fed to the machine along its work path.

23. A machine in accordance with claim 22 including means disposed adjacent the discharge end of the path and actuated by the passage of the trailing end of a bar for stopping the bar, and means operative after the bar has been stopped for actuating said severing means, for severing the strip intermediate the trailing end of the bar and the leading end of a following bar.

24. A machine in accordance with claim 22 wherein said rotary drive wheel means and staking wheel means respectively are independently adjustable in elevation relative to said bed plate.

25. A machine in accordance with claim 19 wherein said bed plate is readily removably for interchange with other bed plates that are formed to accommodate bars of different respective configurations in cross-section.

26. A method for applying pile seal strip to a bar by inserting a length of the strip in an undercut channel in the bar, comprising:

disposing a length of the strip in the channel of the bar with one edge of the strip engaged in the channel and the other projecting therefrom, pressing the other edge of the strip into the channel, to insert the strip in the channel with the pile projecting from the channel, securing the inserted strip in place in the channel, and severing the strip adjacent but remote from an end of the bar.

27. A method for applying pile seal strips to structural bars from a long supply length of the strip, by inserting the strip in undercut channels in the bars, comprising:
- moving the bars successively through a work path in spaced relation to each other,
- disposing the strip in the channel of a first bar as it is moved through the work path, with one edge of the strip engaged in the channel and the other projecting therefrom,
- pressing the other edge of the strip into the channel as the bar continues its movement through the work zone, to insert the strip in the channel with the pile projecting from the channel,
- crimping the channel wall along its length to clamp the inserted strip in place to hold it substantially against movement relative to the bar,
- severing the strip adjacent but remote from the trailing end of the bar to leave an overhanging piece of strip projecting from the bar,
- and continuing the said disposing, pressing, crimping and severing steps on successive bars, to apply strip lengths to the bars.

28. A method for applying pile seal strips to structural bars from a long supply length of the strip, by inserting the strip in undercut channels in the bars, comprising:
- moving the bars successively through a work path in spaced relation to each other and performing a cycle of operations on each of the bars in the work path, including the following steps:
- disposing the strip in the channel of a first bar as it is moved through the work path, with one edge of the strip engaged in the channel and the other projecting therefrom,
- pressing the other edge of the strip into the channel as the bar continues its movement through the work zone, to insert the strip in the channel with the pile projecting from the channel,
- crimping the channel wall along its length as the bar is moved through the work path to clamp the inserted strip in place to hold it substantially against movement relative to the bar,
- stopping the movement of each bar in the work path after the strip has been inserted along the entire length of the bar,
- severing the strip adjacent but remote from the trailing end of the bar to leave an overhanging piece of strip projecting from the bar,
- and continuing the said disposing, pressing, crimping, stopping and severing steps on successive bars, to apply strip lengths to the bars.

References Cited by the Examiner

UNITED STATES PATENTS

| | | | |
|---|---|---|---|
| 2,343,043 | 2/1944 | Brugman | 29—200 |
| 2,695,445 | 11/1954 | Johnson et al. | 29—417 |
| 2,706,328 | 4/1955 | Karmazin | 29—477 |
| 2,749,961 | 6/1956 | Czarnik | 29—33.5 |
| 2,804,101 | 8/1957 | Johnson et al. | 29—208 |
| 3,004,324 | 10/1961 | Macomber | 29—155 |
| 3,077,907 | 2/1963 | Gottlieb | 140—109 |
| 3,132,416 | 5/1964 | Hait | 29—429 |
| 3,158,925 | 12/1964 | Edge | 29—155 |

JOHN F. CAMPBELL, *Primary Examiner.*

THOMAS H. EAGER, *Examiner.*